Feb. 4, 1941.  H. W. SEMAR  2,230,816
APPARATUS FOR CHECKING HOBS
Filed June 6, 1938  3 Sheets-Sheet 1

INVENTOR
HAROLD W. SEMAR.
BY
ATTORNEY

Feb. 4, 1941.  H. W. SEMAR  2,230,816
APPARATUS FOR CHECKING HOBS
Filed June 6, 1938  3 Sheets-Sheet 2

INVENTOR
HAROLD W. SEMAR.
BY
Ralph T. French
ATTORNEY

Feb. 4, 1941.  H. W. SEMAR  2,230,816
APPARATUS FOR CHECKING HOBS
Filed June 6, 1938  3 Sheets-Sheet 3

INVENTOR
HAROLD W. SEMAR.
BY
Ralph T. French
ATTORNEY

Patented Feb. 4, 1941

2,230,816

UNITED STATES PATENT OFFICE 2,230,816

APPARATUS FOR CHECKING HOBS

Harold W. Semar, Springfield, Pa.

Application June 6, 1938, Serial No. 212,089

11 Claims. (Cl. 33—174)

This invention relates to testing devices, and more particularly to apparatus for checking hobs.

Ground hobs used for cutting gears must be extremely accurate, the tolerances usually being only a few ten-thousands of an inch. Actually, the real objective is to have the hobs absolutely accurate, without any measurable variations. When hobs are first made they are hardened, which usually distorts them somewhat, and, to correct this distortion, they are ground. Likewise, after a certain amount of use, hobs become dull, and are sharpened by grinding. In grinding the hobs, for whatever reason, it is necessary to check them from time to time to test the accuracy of the grinding. Obviously, the accuracy of the grinding is determined largely by the ability of the operator to make a careful check, the latter depending on the accuracy of the testing apparatus. The present invention has for an object the provision of a method for accurately and quickly checking hobs, and apparatus for performing the method.

Heretofore, with the known methods and means of checking hobs it has been necessary to check both the pressure angle and the pitch of each cutting tooth, and, as there frequently are several hundred teeth on a single hob, a complete check of such a hob has constituted a lengthy, and hence, necessarily, expensive operation.

It may frequently happen that an inaccuracy in the pitch is counteracted or offset by an inaccuracy in the pressure angle, and vice versa, with the result that in actual use the tooth will function perfectly in cutting the involute surface of the gear being formed. While with previously known hob checking devices the individual inaccuracies were disclosed, there was nothing to indicate when one inaccuracy counteracted or offset another.

It is an object of the present invention to provide a method and apparatus for quickly and accurately checking a path of contact of a hob, which path of contact constitutes the portion of the hob that is active in forming the involute surface of the gear.

A further object of the invention is the provision of a novel method of checking hobs, wherein, instead of checking both the pressure angle and the pitch, it is only necessary to make one check, that of the path of contact, which is, in effect, the resultant of the pressure angle and the pitch.

Another object of the invention is the provision of suitable apparatus for checking hobs according to the method referred to above.

Yet another object of the invention is the provision of hob checking apparatus which will indicate the presence of a satisfactory hob active surface when such a surface results from the offsetting of one inaccuracy by another.

These and other objects are effected by my invention as will be apparent from the following description and claims taken in accordance with the accompanying drawings, forming a part of this application in which:

The action of a hob in forming the involute surfaces of a gear may be likened to that of a single-tooth helical gear in mesh with the gear being formed. The hob is, in effect, a single-tooth helical involute gear, the involute surface of which has been gashed and relieved to provide cutting edges, these cutting edges being the only remnant of the theoretical involute surface.

Figure 1:
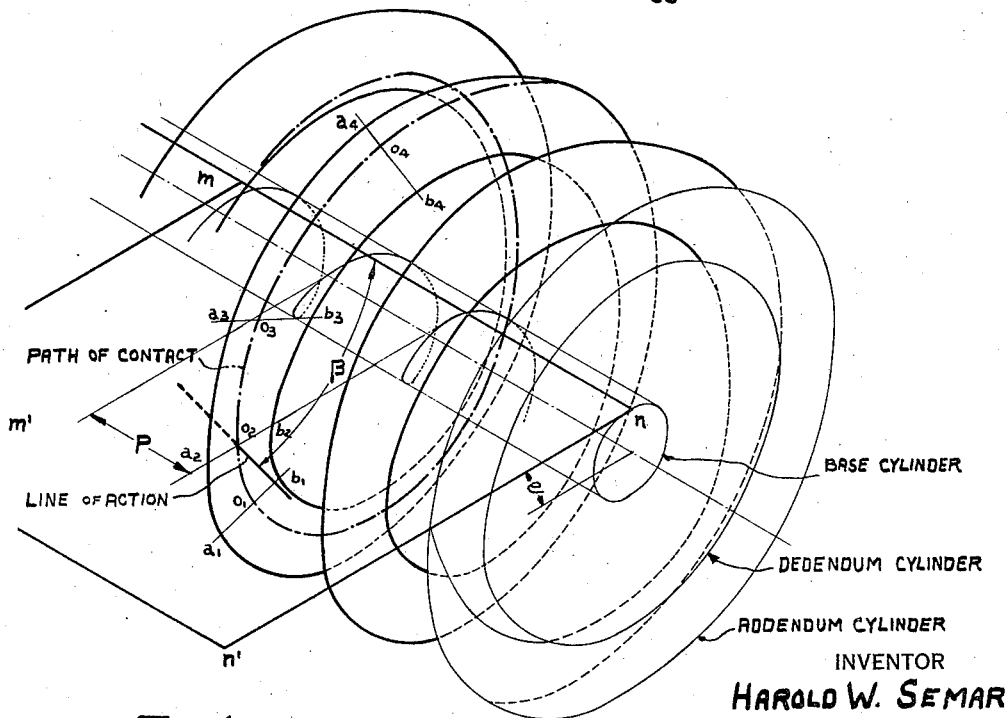
Fig. 1 is a diagrammatic sketch illustrating the action of a hob in cutting the involute surface of a gear.

A helical involute surface is the surface formed by a straight line in a plane as the plane is unwrapped from a cylinder. In Fig. 1, the line $a_2 b_2$ in the plane $m\ n\ n_1\ m_1$ sweeps out the surface $a_1\ b_1\ a_2\ b_2\ a_3\ b_3$—as the plane is unwound from the base cylinder. The involute surface of the tooth is the portion of the surface $a_1\ b_1\ a_2\ b_2\ a_3\ b_3$—lying between the addendum and dedendum cylinders.

In the process of generation, any plane tangent to the base cylinder will intersect the involute surface in a straight line, as, for instance, the plane $mnn_1m_1$ intersects the involute surface along the line $a_2 b_2$. A line in the plane $mnn_1m_1$ at right angles to $a_2 b_2$ through any point $o$ on $a_2 b_2$ is normal to the involute surface and is known as a "line of action." If the line of action shown in Fig. 1 is considered to be fixed in space and the involute surface rotated about its axis, the surface will remain normal to the line of action and the point of intersection of the involute surface with the line of action will advance at a uniform rate. Under these conditions the line of action will cut the involute surface along the line $O_1O_2O_3O_4$ ... and this line constitutes the "path of contact."

When the involute surface engages another gear, and, particularly, when a hob engages a gear being cut, the contact between the mating involute surfaces takes place along a single line of action and sweeps each surface in a path of contact, such as the path $O_1O_2O_3O_4$ ..., described above.

Turning now to the drawings for a detailed description of the novel apparatus, there is shown, at 10, a hob checking machine having a T-shaped base or bed 11 provided with parallel guide plates 12 and 13 spaced apart by a horizontal bearing plate 14, secured thereto in any desired manner, as by welding, as at 16 (Fig. 5), the bearing plate and guide plates comprising the head of the T-shaped base.

A table or carriage 17 is arranged for sliding movement longitudinally of the T-head of the base and is comprised by a horizontal top plate 18, having vertical transverse end plates 19 and 21 secured thereto, as by bolts 22, the end plates resting upon the bearing plate 14, and being closely guided by the plates 12 and 13. Thus, the only frictional contact of the carriage 17 with the base 11 is at the side and bottom surfaces of the end plates 19 and 21, which surfaces, preferably, are ground smooth to provide for minimum friction.

Figure 3:
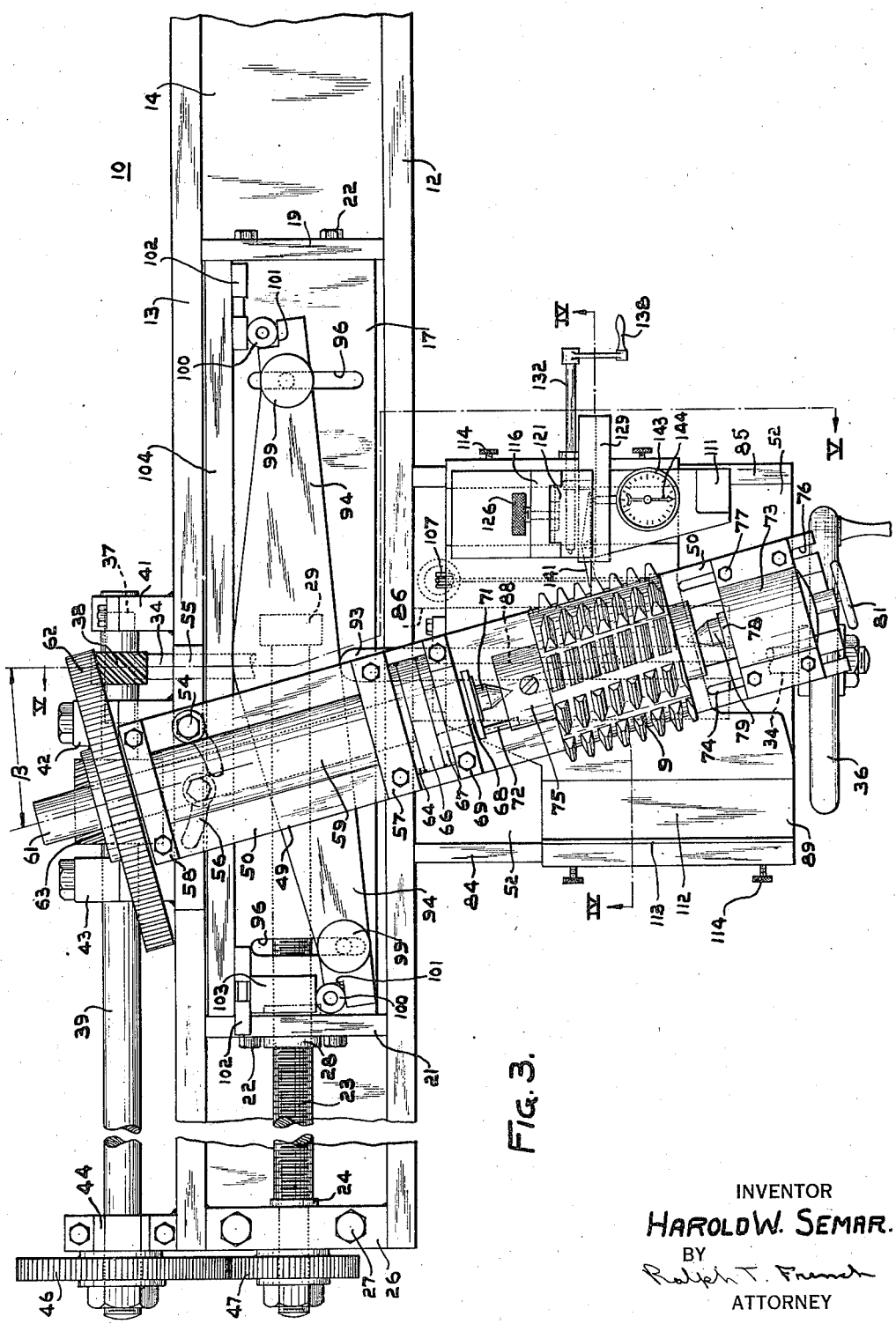
Fig. 3 is a plan view of the apparatus shown in Fig. 2.

Longitudinal sliding movement is imparted to the carriage by means of a screw 23, held against axial movement with respect to the base 11 by a conventional bearing 24, carried by the bearing block 26, which is bolted, at 27, or otherwise attached to the base 11. The screw 23 threadedly engages a suitable threaded box 28, non-rotatably mounted in the end plate 21 of the carriage in a conventional manner. Movement of the carriage to the left, as viewed in Fig. 3, is limited by engagement of the box 28 with the bearing 24, and in a direction to the right by contact of the box 28 with the enlarged end portion 29 of the screw. The screw is rotated through the arrangement of gearing to be hereinafter described.

The stem or leg of the T-shaped base 11 is formed by spaced vertical plates 31 and 32, having therebetween and at right angles thereto, at the end remote from the carriage and its supporting structure, a vertical end plate 33, which, together with the guide plates 12 and 13, provide bearings for a shaft 34 extending horizontally and at right angles thereto, beneath the carriage. The ends of the shaft project beyond the base; the forwardly projecting end having a suitable means, such as the handwheel 36, secured thereto for manual operation thereof, and the rearwardly projecting end carrying a gear 37, meshing with and driving a gear 38, secured on a shaft 39 extending parallel to the screw 23, and rotatably mounted in conventional bearings 41, 42, 43 and 44. A driving gear 46, mounted at an end of the shaft 39, meshes with a driven gear 47, secured to the corresponding end of the screw 23, whereby rotation of the handwheel 36, driving through the shaft 34, gears 37 and 38, shaft 39, gears 46 and 47 and screw 23, causes longitudinal movement of the carriage 17.

Throughout the specification, the terms "front" or "forward indicate that side of the apparatus where the handwheel 36 is located, and the terms "rear" or "rearward" indicate the opposite side, where the gear 38 and shaft 39 are located.

Figure 4:
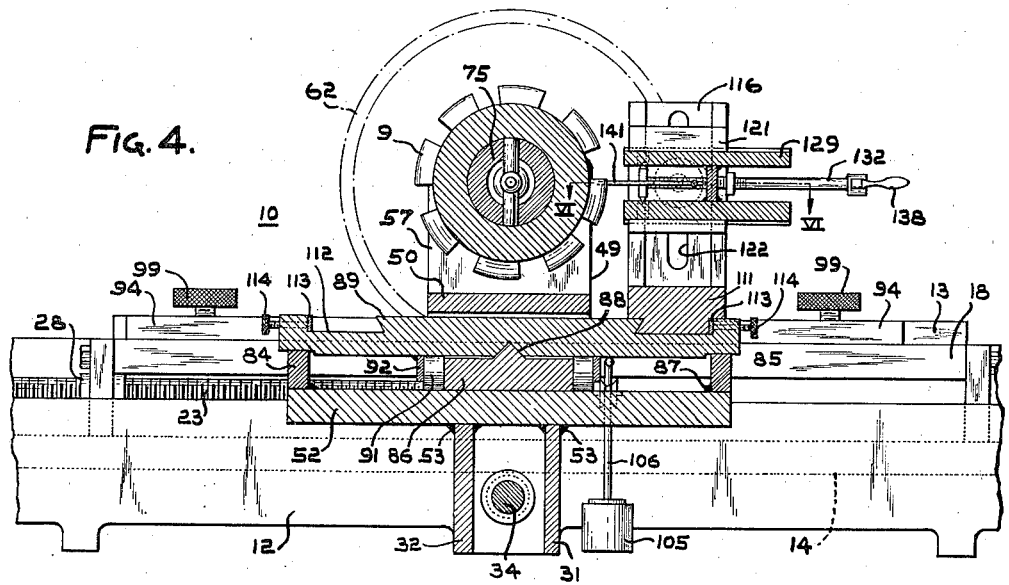
Fig. 4 is a transverse sectional view taken on the line IV—IV of Fig. 3, looking in the direction of the arrows.

A work-supporting table is provided, at 49, comprised by a horizontal plate 50, extending generally from front to rear of the apparatus. A block 51 is secured to the under surface of the plate 50 adjacent the front end thereof, in any suitable manner, as by welding, at 53 (Fig. 4), and rests upon a horizontal plate 52 secured to the plates 31 and 32 forming the stem of the T-shaped base. The rearward end of the plate 50 rests upon a block 55 on the upper surface of the guide plate 13, and is clamped thereto by the bolts 54. The angular position of the work-supporting table 49, relative to the remainder of the apparatus, may be varied through the provision of elongated bolt holes or slots 56, in the plate 50, through which the bolts 54 extend for threaded reception in the block 55 (Fig. 3). Preferably, the slots 56 are so dimensioned and disposed that the angle of the table 49, relative to a plane normal to the path of travel of the carriage 17, may vary to correspond to the base helix angle of the hob being checked. A material change in the angle of the table obviously will necessitate substitution of a set of gears 62, 63 having their teeth so disposed as to freely mesh at the new angle.

The table 49 is provided with a pair of spaced, vertically extending bearing blocks 57 and 58, having mounted therebetween a bracket 59, constituting a journal bearing for a shaft 61. The rear end of the shaft 61 carries a gear 62, meshing with and driven by a worm gear 63, keyed on the shaft 39. The front end of the shaft carries a clutch disc 64, connected by an intermediate disc 66 to a similar disc 67, carried by a short shaft 68 journaled in a head-stock 69 mounted on the table 49. A conical center 71 projects axially from the front end of the short shaft 68, the latter being provided with suitable means, such as the dog 72, for transmitting rotation to the hob being checked.

A tail-stock 73 is mounted on the front end of the table, and means are provided for adjustment of the former along the latter, comprising slots 74 and 76 slidably receiving the clamping bolts 77. The tail-stock is of conventional structure, and includes a shaft 78 carrying a rearwardly projecting conical center 79, the shaft and center being projected or retracted by the handwheel 81, in a well-known manner.

Rotation of the handwheel 36 operates through the shaft 34, gears 37 and 38, shaft 39, gears 63 and 62, shaft 61, clutch 66, shaft 68 and dog 72 to rotate the hob, mounted on the centers 71 and 79.

The plate 52 of the base 11 has a pair of spaced bearing slide blocks 84 and 85, extending parallel to the shaft 34 and transversely of the path of movement of the carriage 17, the blocks being secured to the upper surface of the plate in any desired manner, as by welding at 87. A slide block 86 is carried by the plate 52, intermediate and parallel to the slide blocks 84 and 85, and is provided with a guide ridge 88, of inverted V-shape cross-section.

Figure 2:
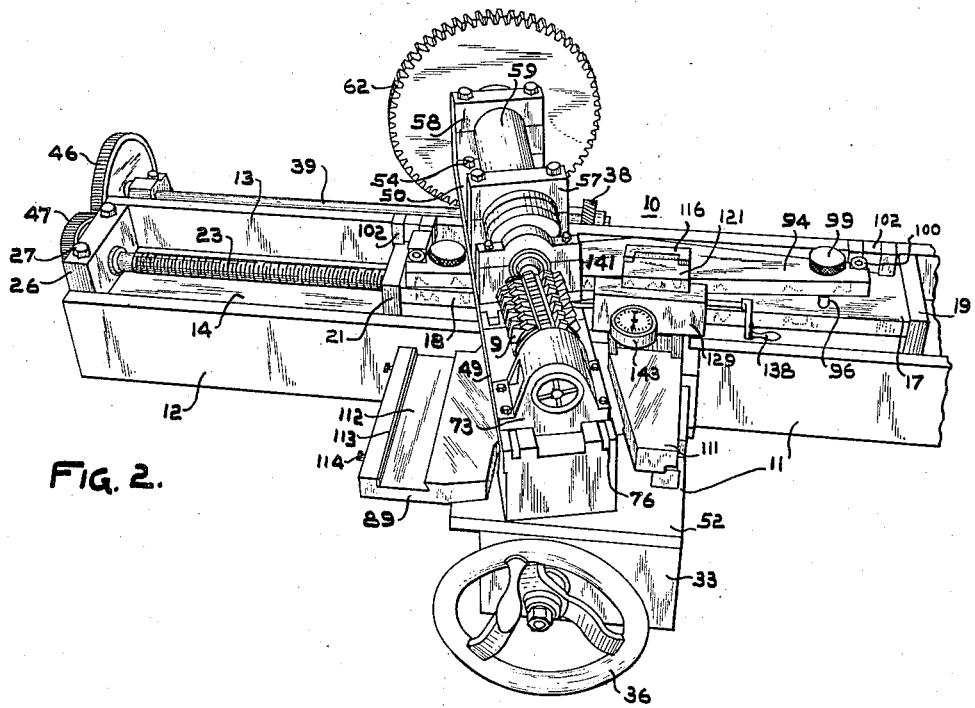
Fig. 2 is a perspective of the novel hob checking apparatus.

Supported and guided by the slide blocks 84, 85 and 86 is a slide 89, which, in turn, supports a measuring mechanism that will be described later. The slide 89 is roughly U-shaped in plan (Figs. 2 and 3), the space between the legs of the U providing clearance about the block 51 supporting the forward end of the plate 50. Preferably, movement of the slide is facilitated by the provision of a plurality of rollers 91, guided by a floating retaining frame 92, disposed between the plate 52 and the slide 89. The slide has a rearwardly projecting cam member 93, adapted to be engaged by the straight edge of a sine bar 94, carried by the carriage 17.

The sine bar is positioned with its straight edge at an angle to the path of travel of the carriage 17, so that movement of the carriage will cause the straight edge to move the cam 93 and its associated slide 89. The angular position of the sine bar is such that upon one revolution of the hob, the slide will move a distance equal to the base pitch of the hob. As the base pitch of various hobs to be checked will frequently vary, provision is made for correspondingly varying the angle of the sine bar, and for this purpose, the carriage 17 is provided with transverse slots 96 adjustably receiving studs 97, threadedly mounted in the ends of the sine bar, and having enlarged heads 98 engaging the under surface of the carriage 17, to clamp the sine bar thereto. Preferably, the studs 97 are provided with enlarged and knurled hand pieces 99. Accurate positioning of the sine bar is secured by the use of cylindrical gage blocks 100, placed in notches 101 at the ends of the sine bar. Standard gage blocks, such as the blocks 102 and 103, space the cylindrical blocks 100 from a gage bar 104, carried by the carriage 17 at the rear of the upper surface thereof.

In order to insure engagement of the cam 93 by the sine bar 94 at all times, and particularly when the straight edge of the latter is moving rearwardly away from the former, a weight 105 is connected to the front edge of the slide 89 by a flexible element, such as the cord or chain 106, passing over a pulley 107 spaced rearwardly, of the point of attachment of the weight to the slide, a distance greater than the maximum travel of the latter. The weight is sufficiently heavy to keep the slide 89 pulled rearwardly as far as permitted by engagement of the cam 93 with the sine bar.

The actual measuring mechanism is comprised by a base 111 movably mounted on the slide 89, on dove-tail ways 112; lost motion between said parts being taken up by means of a gib 113 and screws 114, in the usual manner. Duplicate ways are provided on the slide, at opposite sides of the work-supporting table 49, whereby the same measuring mechanism may be used for checking the hob from either side, merely by changing the mechanism from one of the ways to the other, as conditions may require.

Figure 5:
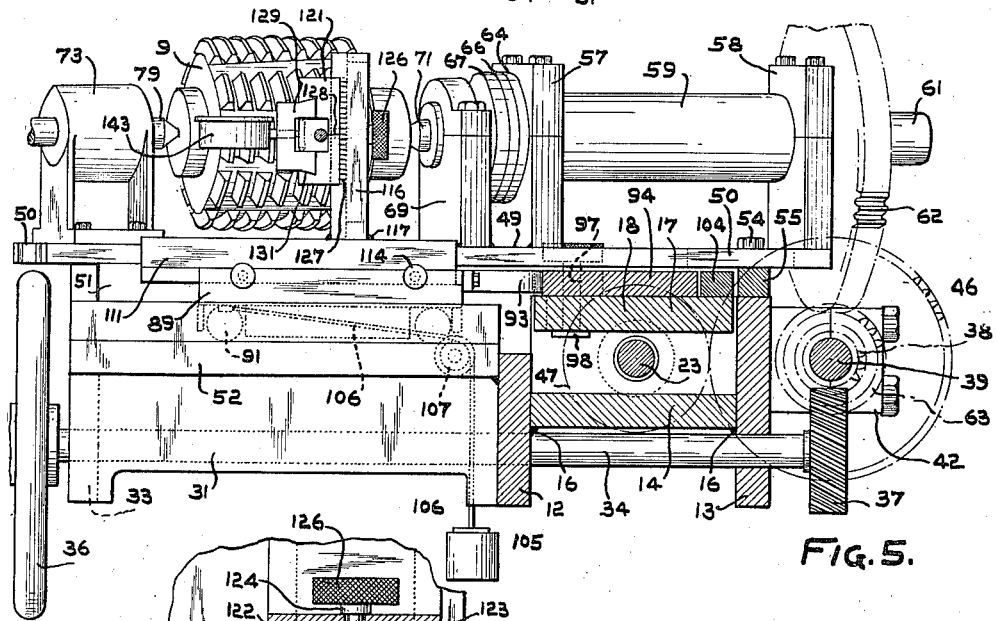
Fig. 5 is a transverse sectional view taken on the line V—V of Fig. 3, looking in the direction of the arrows; and, Fig. 6 is a horizontal sectional view taken on the line VI—VI of Fig. 4, looking in the direction of the arrows.
Figure 6:
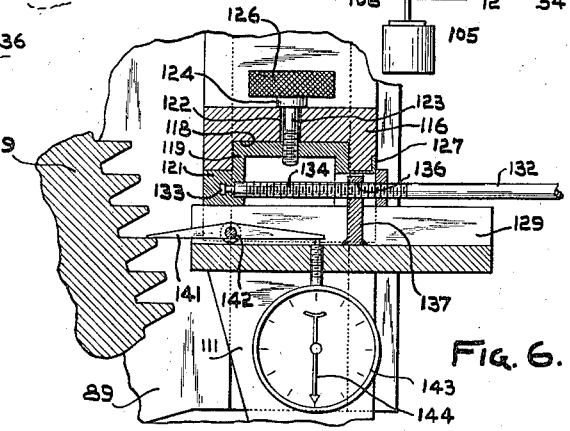

The base 111 has an upright 116 secured thereto, as by welding at 117 (Fig. 5). The upright is provided with a vertical channel 118, in its forward surface, in which is slidably received the similarly shaped shoulder 119 of an indicator carriage 121. The upright 116 is provided with a vertical slot 122 extending through the wall defining the bottom of the channel 118. A stud 123, having one end threadedly mounted in the indicator carriage 121, extends through the slot 122, and has a shoulder 124 contacting the rear surface of the upright, whereby tightening of the stud clamps the indicator carriage in adjusted vertical position. Preferably, the stud is provided with a knurled hand piece 126.

A graduated scale 127 and a cooperating reference mark 128 are provided, the former on the upright and the latter adjacent thereto on the indicator carriage, for quick and accurate determination of the distance the latter is raised or lowered.

An indicator housing 129 is mounted on ways 131 for sliding movement transversely of the apparatus (Figs. 2 and 3), such movement being imparted thereto by a shaft 132 having one end rotatably mounted in a wall of the indicator carriage, as at 133 (Fig. 3). The shaft 132 is provided with a threaded portion 134 extending through a correspondingly threaded opening 136 in a block 137, carried by the housing 129. Preferably, the shaft 132 is provided with a crack handle 138 (Fig. 4), for manual rotation thereof to move the indicator housing towards or away from the hob.

A work-contacting finger 141 is pivotally mounted on a vertical pin 142, carried by the housing, one end of the finger projecting beyond the end of said housing for engagement with the hob, and the opposite end operatively contacting the plunger of a dial indicator 143, the latter being graduated in thousands or ten-thousands of an inch, and having an arrow or other marker 144 to clearly indicate the degree of any inaccuracies on the hob, as contacted by the finger 141.

In the operation of the device, a hob 9, to be checked, is mounted on the arbor 75, rotatably carried by the centers 71 and 79. The work-supporting table 49 is so adjusted that the angle B between the hob axis and the path of travel of the slide 89 is the same as the base helix angle of the hob. The angle B will lie between 14° 30″ and 30°, depending upon the base helix angle of the particular hob being checked, and may be determined by the relation—$\cos B = \cos A \cos H$ where A is the pressure angle of the hob in a normal plane; and, H is the helix angle of the hob. The sine bar 94 is set so that for one revolution of the hob the slide 89 will advance a distance equal to the base pitch $b$ of the hob. The base pitch is determined by the relation—$b = p \cos A$, where $p$ is the pitch of the hob in a normal plane; and, A is the pressure angle of the hob in a normal plane. The indicator carriage 121 is moved vertically so that the finger 141 lies in a horizontal plane tangent to the base cylinder of the hob. The radius $e$ of the base cylinder is determined by the relation—

$$e = \frac{p}{2\pi \cos H}$$

where $p$ is the pitch of the hob in a normal plane; and, H is the helix angle of the hob. Therefore, the indicator housing 121 is adjusted vertically so that the finger 141 lies a distance $e$ above or below the hob axis. The carriage 17, carrying the sine bar, is set near the middle of its stroke by turning the handwheel 36, and the finger 141 adjusted to contact a hob tooth, selected as a center tooth, at the pitch line. This setting of the finger is attained by rotating the hand crank 138 and by sliding the base 111 on the ways 112 (Fig. 4), with the indicator reading zero.

The handwheel 36 is turned until the finger reaches the limit of its contact with the tooth, at either the root or the tip thereof. The handwheel is then turned in the opposite direction, and as the cutting edges of the hob teeth pass the finger, the maximum reading of the indicator is noted. Inaccuracies in the cutting edges of the hob will appear as variations in the indicator readings. Assume that the finger is touching a tooth at the base thereof. As the handwheel is turned, the edge of one tooth after another, in succession, will contact the finger. The distance from the base of each tooth to the point on the edge thereof where the finger touches will increase a uniform amount for each successive tooth. Thus, from the first to the last tooth checked, the points touched on the teeth by the finger will range, by uniformly increasing amounts, from the base of the first tooth to the tip of the last tooth. For example, with a hob whose path of contact is comprised by 16 teeth, each of which has a cutting edge one inch long, the finger will touch each successive tooth edge one sixteenth of an inch farther from its base than it did the preceding tooth.

Each tooth does not cut along its entire edge, but only at a singe point thereon, and the points touched and checked by the finger constitute the actual cutting portions of the teeth.

By this means the cutting edges of the hob teeth are examined at the exact points which contact the gear during the hobbing process, and in the same sequence. By mounting the hob on the hobbing machine with the previously selected center tooth on the center of the machine, the same sequence of teeth which have been checked will do the work of forming the tooth surface of the gear.

It will be noted that the length of time required for the checking operation described above is very short as compared to that necessary for checking the pressure angle and the pitch of each tooth on the hob.

While I have shown the invention in only one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. Hob checking apparatus comprising a base, means on said base for supporting a hob to be checked, a second supporting means on said base disposed in predetermined relation to the first-mentioned supporting means, indicating means carried by said second supporting means and including a contact element adapted to engage the hob, and means mounted on the base for causing relative angular movement between said indicating means and said hob in parallel horizontal planes.

2. Hob checking apparatus comprising a base, means on said base for rotatably supporting a hob, a slide on said base movable past the hob in a direction at an angle to the longitudinal axis thereof and in a plane parallel thereto, mechanism carried by the base for rotating the hob and simultaneously causing the slide to move therepast, and indicating means carried by said slide for contacting the teeth of said hob.

3. A hob testing machine comprising a base, means on said base for rotatably supporting the hob, a slide movable on said base past said hob in a direction at an angle to the longitudinal axis of the latter, said angle being between 14° 30″ and 30°, means mounted on the base for rotating the hob, means associated with said last-mentioned means for moving the slide past the rotating hob, and indicating means carried by the slide for contacting the teeth of the hob.

4. A hob checking machine comprising a base, means on said base for rotatably supporting the hob, a slide carried by said base and movable past said hob in a direction at an angle to the longitudinal axis thereof, said angle being between 14° 30″ and 30°, indicating means on said slide adapted to contact the teeth of the hob, and means carried by the base and providing for rotation of the hob and simultaneous advancement of the slide in harmony with the lead of the helically-arranged hob teeth, said first-mentioned means being adjustable on said base whereby said angle may be varied to suit the particular hob being checked.

5. Hob checking apparatus comprising a base, means on said base for rotatably supporting the hob with the longitudinal axis of the latter disposed in a horizontal plane, a slide on said base movable past said hob at a predetermined angle B to the longitudinal axis thereof and in a horizontal plane, an indicator on said slide, means carried by the base for rotating the hob, and means associated with the base for moving the slide past said hob, said first-mentioned means providing for varying the angle B between the longitudinal axis of the hob and the path of travel of the slide, said angle B being determinable by the relation: cos B = cos A cos H, where A is the pressure angle of the hob in a normal plane and H is the helix angle of the hob.

6. Hob checking apparatus comprising a base, means on said base for rotatably supporting a hob, a slide on said base movable past said hob at an angle to the longitudinal axis of the latter, said angle being between 14° 30″ and 30°, indicating means on said slide adapted to contact the teeth of the hob, a carriage on said base movable transversely of the direction of movement of the slide, means carried by the base for rotating the hob and simultaneously moving the carriage, and cooperating means on said carriage and slide whereby movement of the carriage causes movement of the slide past the hob as the latter is rotated.

7. Hob checking apparatus comprising a base; means on said base for rotatably supporting a hob; a slide mounted on said base and movable past said hob at a predetermined angle to the longitudinal axis of the latter, said angle being between 14° 30″ and 30°; and measuring mechanism mounted on said slide for adjustment therealong in a direction parallel to the path of movement thereof, said mechanism including a carriage adjustable vertically relative to the slide, an indicator housing adjustably carried by said carriage, an indicator on said housing, and means cooperating with said housing for adjusting the latter and said indicator relative to the carriage toward or away from the hob.

8. In a device for checking hobs, a base, a slide mounted for straight-line reciprocatory movement thereon, a table mounted on said base for rotatably supporting a hob, and indicating means carried by said slide and including a contact element cooperable successively with a point on each of a series of teeth on the hob being checked, the hob-supporting table being so disposed that the longitudinal axis of the hob supported thereon is at such an angle to the path of said reciprocatory movement of the slide as will render the series of points a path of contact of the hob, said angle being between 14° 30″ and 30°.

9. In a device for checking hobs, a base, a carriage mounted for straight line reciprocatory movement thereon, a hob-supporting table secured to the base, a slide mounted on said base for straight line reciprocatory movement past the hob at a predetermined angle to the longitudinal axis thereof and in a path generally transverse to the path of movement of the carriage, said predetermined angle being between 14° 30″ and 30°, a sine bar carried by said carriage and extending generally longitudinally thereof, said sine bar having a straight edge at the side adjacent the slide, means for adjusting said sine bar with its straight edge at an angle to the path of motion of its supporting carriage, means carried by the base for rotating the hob and reciprocating the carriage, and means carried by the slide and contacting the straight edge of said sine bar for causing the slide to move past the rotating hob.

10. A structure as specified in claim 9, wherein said last-mentioned means causes movement of the slide in only one direction, and additional means carried by the base for causing movement of the slide in the opposite direction.

11. In a device for checking hobs; a base; a carriage mounted for straight line reciprocatory movement thereon; a hob-supporting table secured to said base; a slide mounted on said base for straight line reciprocatory movement past the hob at an angle to the longitudinal axis thereof and in a path generally transverse to the path of movement of the carriage, said angle being between 14° 30″ and 30°; a sine bar on the carriage, said sine bar having a straight edge positioned at an angle to the path of movement of said carriage; shaft and gear mechanism for rotating the hob and reciprocating the carriage and sine bar; an element rigidly secured to the slide and adapted to be contacted by the straight edge of the sine bar, the latter, in one direction of its reciprocatory movement, camming the slide to advance the latter past the hob; and means on the base urging said slide in the reverse direction during movement of the sine bar in the opposite direction of its reciprocatory movement.

HAROLD W. SEMAR.